June 7, 1949.  A. S. KROTZ  2,472,160
FLEXIBLE TRUCK FOR RAIL VEHICLES
Filed Feb. 2, 1945  2 Sheets-Sheet 1
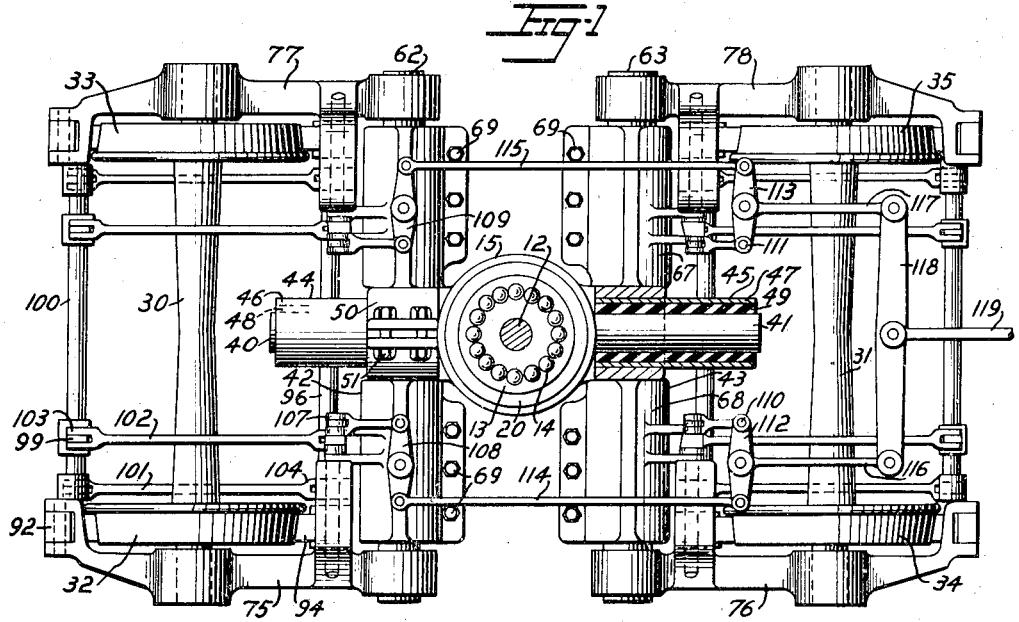
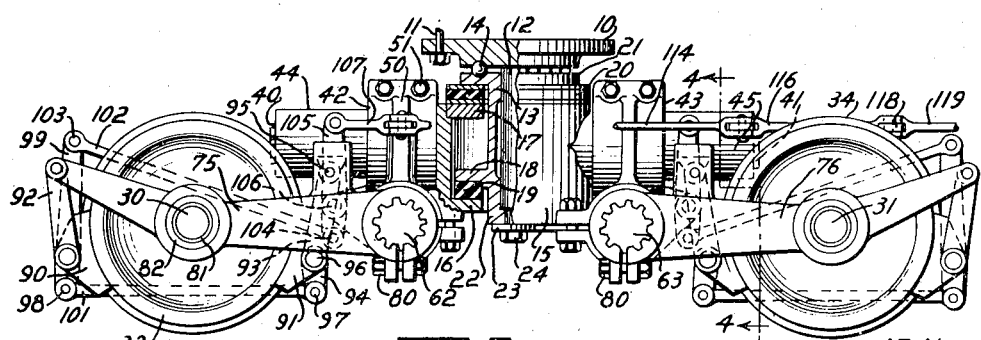
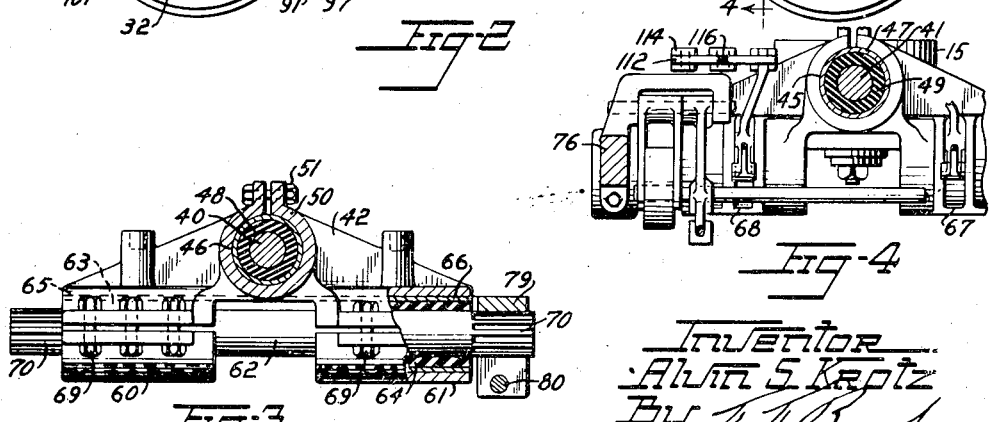
Inventor
Alvin S. Krotz June 7, 1949.  A. S. KROTZ  2,472,160
FLEXIBLE TRUCK FOR RAIL VEHICLES
Filed Feb. 2, 1945  2 Sheets-Sheet 2
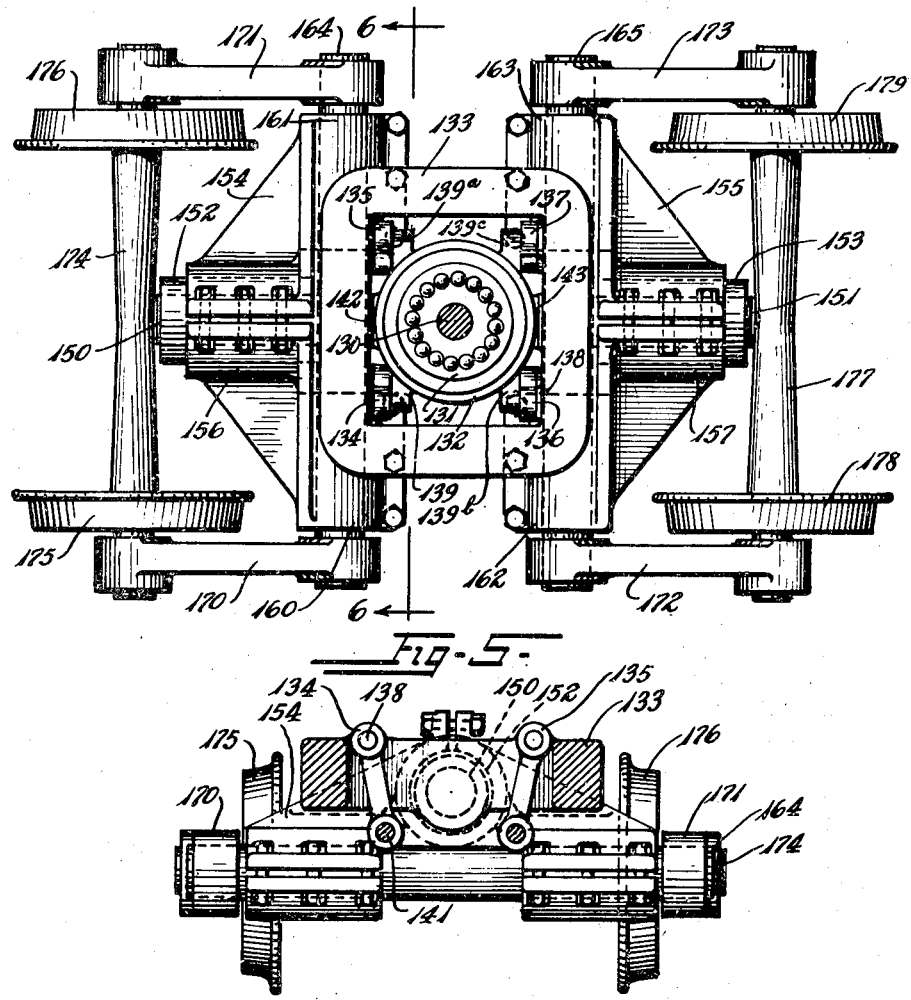

Patented June 7, 1949

2,472,160

UNITED STATES PATENT OFFICE 2,472,160

FLEXIBLE TRUCK FOR RAIL VEHICLES

Alvin S. Krotz, Akron, Ohio, assignor to The B. F. Goodrich Company, New York, N. Y., a corporation of New York Application February 2, 1945, Serial No. 575,772

5 Claims. (Cl. 105—182)

This invention relates to vehicle trucks and more particularly to trucks for vehicles for operation upon rails.

With increase in the speed of operation of railway trains and similar rail-operated vehicles it has become desirable to provide more effective cushioning of the load, to improve riding comfort, to reduce noise and vibration, and to provide greater flexibility, as well as to improve braking of the vehicle.

The principal objects of the present invention are to provide more efficient cushioning of the load, to reduce shock and vibration, to provide springing of the wheels of the truck both in vertical and lateral twist movements, to provide for controlling lateral sway movement of the vehicle, and to provide efficient braking of the vehicle while permitting effective springing thereof.

These and other objects will appear from the following description and the accompanying drawings.

Of the drawings:

Fig. 1 is a plan view of a truck for a rail vehicle constructed in accordance with and embodying the invention, portions being broken away and portions shown in section.

Fig. 2 is a side elevation thereof, parts being broken away to show construction.

Fig. 3 is a detail view of one of the compound spring structures, parts being broken away to show construction.

Fig. 4 is a detail sectional view, taken on line 4—4 of Fig. 2, showing the brake structure, parts being broken away.

Fig. 5 is a plan view of a modified form of the invention.

Fig. 6 is a sectional view thereof, taken on line 6—6 of Fig. 5.

In accordance with the invention the car body is supported from a center bearing of the truck for swivel action about a vertical axis, while restricted cushioning and floating movement of the center bearing with respect to the wheels is permitted and compound torsional springing of the load about axes at right angles to each other is provided, permitting vertical angular displacement of the wheels with respect to each other in planes lateral of the truck.

Referring to Figs. 1 to 4 of the drawings, the car body (not shown) may rest upon and be secured to a bearing plate 10, as by bolts 11. Fixed to the plate 10 is a vertically disposed king pin 12 which is freely rotatable within a floating center bearing 13 of a car-supporting structure, the bearing plate and center bearing having flanges with annular ball races facing each other for receiving anti-friction ball bearings 14 to reduce friction.

For supporting and cushioning the center bearing 13, the car-supporting structure is provided with a trunnioned barrel 15 having a vertical axis. The barrel has an inwardly directed flange 16 at its lower end and is counterbored at its upper end to receive a removable annular flange 17, the flanges having central openings larger than the center bearing to permit floating movement thereof with respect to the barrel. The center bearing has an outwardly directed flange 18 of less diameter than the bore of the barrel and a cushioning ring 19 rests on the flange 16 and supports the center bearing from the flange 18 while a similar cushioning ring 20 rests on the removable flange 17 and supports the center bearing by engaging its bearing flange 21. The cushioning rings are of resilient soft vulcanized rubber or other rubber-like material and preferably have upper and lower facings of metal secured thereto as by a bond resulting from vulcanization to distribute the load and prevent excessive wear and spread of the cushioning material under pressure. The arrangement is such that the entire load of the car body is carried on the cushioning rings under compression thereof, and floating of the car body in a horizontal plane is permitted both longitudinally and laterally of the truck, being resisted by the cushioning rings acting in shear, while the relative dimensions of the center bearing and the flanges of the barrel limit the extent of such movement. The king pin 12 is reduced at its lower end to pass an inwardly directed flange 22 of the center bearing, and a washer 23 about the reduced portion engages the lower face of the center bearing and is held in place by a nut 24 threaded on the reduced portion to hold the king pin in place while permitting its rotation with respect to the center bearing.

For engaging the track, the truck is provided with a pair of axles 30, 31 having flanged wheels 32, 33 and 34, 35 thereon respectively. These axles and wheels may be of any suitable car wheel and axle construction.

For transmitting the load from the car-supporting structure to the wheels while providing for springing of the vehicle, the barrel 15 is provided with trunnions 40, 41 extending longitudinally of the truck in alignment with each other with their axes intersecting the vertical axis of the barrel. A pair of cross yokes, 42, 43 are adjustably mounted respectively about the trunnions and are cushioned therefrom for torsional movement by spring structures 44, 45. The spring structures comprise cylindrical housings 46, 47 spaced from the trunnions 40, 41 respectively by bodies 48, 49 of soft vulcanized rubber or other rubberlike material, preferably of cylindrical bushing form and secured to the trunnion and housing, preferably by a bond of vulcanization. The yokes each have a split collar portion, such as 50, at their centers (see Fig. 3) and are adapted to be drawn together by bolts 51 at their split portions to clamp them in any position of adjustment about the housings 46, 47. The arrangement is such that angular movement tending to twist the yokes out of parallel relation is resisted by the resilient bodies 48, 49 acting under torsion.

Yoke 42 is formed with a pair of collar portions 60, 61 preferably of split construction having aligned bores on an axis lateral of the truck. A shaft 62 extends through the collars and is separated therefrom by torsion spring structures comprising bodies 63, 64 of soft vulcanized rubber or other rubberlike material enclosed by tubular housings 65, 66 of metal and each secured to its housing and to the shaft preferably by a bond of vulcanization. Yoke 43 has similar aligned collar portions 67, 68 through which a shaft 63, similar to shaft 62, extends, and similar torsion spring structures surround the shaft within the collar portions. The collars are clamped about the spring structures by bolts 69. The arrangement is such that by loosening bolts 69, the shafts 62, 63 with their spring structures may be rotatably adjusted or assembled or removed and with the bolts drawn up the shafts may be turned only by torsional stressing of the spring structures.

Shafts 62, 63 extend beyond the yokes and their extending ends are splined or serrated as at 70 to receive the hubs of torsion arms 75, 76, 77, 78, two of which are secured to each shaft. Each arm extends in a substantially horizontal direction, two arms on one shaft extending forwardly and two rearwardly of the truck, and has a serrated split hub, such as 79, for engaging a shaft in a plurality of positions of angular adjustment, and a clamp bolt 80 for clamping it in place. Each arm also carries a journal box, such as 81, for engaging a wheel axle. The journal box may be separated from the arm by a shock resisting bushing 82, of rubber or other rubberlike material, which permits some independent movement of the wheels. The arrangement is such that the entire load of the vehicle is carried from the axles through the torsion arms 75, 76, 77, 78 to the car-supporting structure by the resilient torsion springs, and while each axle with its torsion arms and torsion shaft acts substantially in unison during vertical deflections of the wheels, the axles and their associated torsion arms and spring structures are capable of deflection into nonparallel relation or with the truck in twist as where one wheel is raised momentarily to pass an object on the track or the truck is entering or leaving a banked section of track to or from a level section.

To provide for braking of the truck while permitting torsional springing of the wheels, a pair of clasp type brake shoes, such as 90, 91, are hung at opposite sides of each wheel by links 92, 93 from the adjacent torsion arm. A lever 94 has its upper end pivoted as at 95 to the torsion arm, is fulcrumed on the brake beam 96 which connects the brake shoes at opposite wheels of the same axle, and has its lower end connected pivotally, as at 97 to the lower end 98 of a lever 99, pivoted on the opposite brake beam 100, by a link 101. A link 102 is pivotally connected at one end, as at 103, to lever 99, and its opposite end is pivotally connected, as at 104, to the lower end of a lever 105 fulcrumed on the torsion arm, as at 106. The upper end of lever 105 is pivotally connected by a link 107 with one end of a lever 108 fulcrumed on the yoke 42. A similar brake mechanism on the opposite wheel is similarly linked to one end of a lever 109 on the same yoke 42. On the arms 76 and 78 similar brake mechanism is provided and pivotally connected as at 110 and 111 to one end of equalizer levers 112, 113 respectively, the opposite ends of which are pivotally connected by links 114, 115 to the opposite ends of levers 108, 109 respectively. The centers of equalizer levers 112, 113 are pivotally connected by links 116, 117 respectively to the ends of an equalizer lever 118, the center of which is pivotally connected by a rod 119 to an operating cylinder (not shown). The arrangement is such that a pull on rod 119 sets the brakes on all four wheels and the adjustment of the brakes is not substantially altered by torsional twisting movement of the truck or by deflection of the torsion arms.

Referring to Figs. 5 and 6 of the drawings, these show a modified construction providing for greater sway movement of the vehicle while providing all the advantages of the form of the invention heretofore described. In this form of the invention the king pin 130 is pivotally mounted on a center bearing 131 supported by a barrel 132, the construction being identical to that previously described except that the barrel 132 has no trunnions but is located within a supporting frame 133 from which it is suspended by links 134, 135, 136, 137. These links are pivotally hung from the frame by pins, such as 138, and are pivotally connected to ears 139, 139a, 139b, 139c formed on the barrel, as by pins 141. For limiting movement of the barrel longitudinally of the truck, bearing surfaces 142, 143 on the barrel rest upon bearing surfaces of the frame 133.

The supporting frame 133 has trunnions 150, 151 extending in alignment of each other longitudinally of the truck. Torsion spring structures 152, 153, each preferably including a cylindrical housing about a trunnion and a body of soft vulcanized rubber or other rubberlike material surrounding the trunnion within the housing and secured to both the trunnion and the housing as by a bond of vulcanization, are provided about the trunnions. Yokes 154, 155 are mounted upon the spring structures, and have split collars 156, 157 for adjustably clamping them thereabout.

The yokes 154, 155 adjustably engage torsion spring structures 160, 161, 162, and 163 respectively which are secured to shafts 164, 165, extending therethrough. The spring structures each include an outer housing of cylindrical form and a body of resilient soft vulcanized rubber or other rubberlike material about the shaft within the housing and secured to both as by a bond of vulcanization. Torsion arms 170, 171, and 172, 173 are adjustably secured to the ends of shafts 164, 165 respectively, the shafts being serrated as in the form of the invention shown in Figs. 1 to 4, and the torsion arms being identical to the arms there shown and previously described. Arms 170, 171 engage an axle 174 having track wheels 175, 176, and arms 172, 173 similarly engage an axle 177 having track wheels 178, 179. The brake mechanism is not shown but may be the same as that shown in Figs. 1 to 4. The arrangement is such that the entire load of the car body is carried by the center bearing through the barrel 132 to the supporting frame 133 where it is transmitted through the torsion spring structures and torsion arms to the axles. Sway of the car body is permitted by the links supporting the barrel from the supporting frame as well as by the bearing supporting and cushioning structure within the barrel. In this construction helical twist of the truck in a longitudinal direction is also permitted by the trunnions and their surrounding spring structures, while the load of the vehicle is cushioned by the laterally disposed spring structure.

Variations may be made without departing from the scope of the invention as it is defined by the following claims.

I claim:

1. A truck for a rail-type vehicle, said truck comprising a pair of axles having rail wheels, a center bearing for pivotally supporting a car, a frame member about said center bearing, link means for suspending said center bearing from said frame member, trunnions extending longitudinally of said frame member, torsion springs about said trunnions, each of said springs comprising a housing about one of said trunnions and a body of resilient rubberlike material between said housing and said trunnion and secured thereto, a pair of yokes each adjustably secured to one of said housings, springs secured to each yoke, each of said last named springs comprising inner and outer members and a body of resilient rubberlike material therebetween and secured thereto, one of said members being secured to the yoke, and a torsion arm secured to the other member, said torsion arm providing a bearing for one of said axles.

2. A rail-type vehicle truck comprising a center bearing structure for pivotally supporting a car structure about a vertical axis, axles at the front and rear of the truck each having wheels for engaging rails, supporting arms connected to said axles, and a spring structure for supporting said center bearing structure from said arms, said spring structure comprising a set of torsion springs having their axes disposed longitudinally of the truck and each including inner and outer members with an interposed body of resilient rubber-like material resisting relative rotation of said members, and said spring structure also comprising a second set of torsion springs having their axes disposed crosswise of the truck and each having inner and outer members and an interposed body of resilient rubber-like material resisting relative rotation of said members thereof, one of said members of each spring of the first said set being secured against rotation with respect to said center bearing structure and the other member of each spring of the first said set being secured against movement with respect to a member of each spring of said second set, the remaining member of each spring of said second set being secured to one of said supporting arms in a manner to permit lateral tilting movement of said wheels with respect to said center bearing structure by rotative action of the first said set of springs and to permit up and down movement of said wheels with respect to said center bearing structure by rotative action of said second set of springs.

3. A rail-type vehicle truck comprising a center bearing structure for pivotally supporting a car structure about a vertical axis, a pair of through axles each having wheels for engaging rails, and a torsion spring structure for supporting said center bearing structure from said axles, said torsion spring structure comprising a set of torsion springs having their axes disposed longitudinally of the truck and including inner and outer nested members, the inner member of each spring being secured against rotation with respect to said center bearing structure with a resilient element secured between said nested members, and said spring structure also comprising a second set of torsion springs having their axes disposed crosswise of the truck and each spring having nested inner and outer members and a resilient sleeve element secured therebetween, one of said last named nested members of each said second set being secured to the rotatable nested member of the first said set and the other member of each second said set having an arm extending longitudinally of the truck and a bearing thereon for engaging one of said axles, the arrangement permitting tilting movement of said axles with respect to said center bearing structure by rotative action of the first said set of springs and up and down movement of said axles with respect to said center bearing structure by rotative action of said second set of springs.

4. A rail-type vehicle truck comprising a center bearing structure for pivotally supporting a car structure about a vertical axis, a pair of through axles each having wheels for engaging rails, and a torsion spring structure for supporting said center bearing structure from said axles, said torsion spring structure comprising a set of torsion springs having their axes disposed longitudinally of the truck and including inner and outer nested members, one of which members being secured against rotation with respect to said center bearing with a resilient element secured between said nested members, and said spring structure also comprising a second set of springs having their axes disposed crosswise of the truck, the springs of said second set each having nested inner and outer members and a resilient element secured therebetween, one of said last named nested members being secured to the rotatable nested members of the first said set and the other member of said last named nested members having an arm extending longitudinally of the truck and a bearing thereon for engaging one of said axles.

5. A rail-type vehicle truck comprising a center bearing structure for pivotally supporting a car structure about a vertical axis, a pair of through axles each having wheels for engaging rails, and a torsion spring structure for supporting said center bearing structure from said axles, said torsion spring structure comprising a set of torsion springs having their axes disposed longitudinally of the truck and including inner and outer nested members, the inner member of each spring being a fore and aft trunnion secured against rotation with respect to said center bearing structure, with a resilient element secured between said nested members, and said spring structure also comprising a second set of torsion springs having their axes disposed crosswise of the truck, said secondary torsion springs each having nested inner and outer members and a resilient element secured therebetween, the outer of said last named nested members being secured to the outer member of the springs of the first said set, and the inner member of said last named nested members having an arm extending longitudinally of the truck and a bearing thereon for engaging one of said axles.

ALVIN S. KROTZ.

REFERENCES CITED

The following references are of record in the file of this patent:

UNITED STATES PATENTS

| Number | Name | Date |
|---|---|---|
| 2,177,893 | Krotz | Oct. 31, 1939 |
| 2,253,042 | Muchnic | Aug. 19, 1941 |
| 2,268,439 | Beebe | Dec. 30, 1941 |